United States Patent [19]

Knierriem et al.

[11] Patent Number: 5,030,413
[45] Date of Patent: Jul. 9, 1991

[54] CORE INTERNALS OF A WATER-COOLED NUCLEAR REACTOR

[75] Inventors: Leonhard Knierriem, Erbach; Franz Pötz; Heinz Franke, both of Heddesheim, all of Fed. Rep. of Germany

[73] Assignee: ABB Reaktor GmbH, Mannheim, Fed. Rep. of Germany

[21] Appl. No.: 441,889

[22] Filed: Nov. 27, 1989

[30] Foreign Application Priority Data

Nov. 25, 1988 [DE] Fed. Rep. of Germany ....... 3839838

[51] Int. Cl.⁵ .............................................. G21C 5/06
[52] U.S. Cl. .................................. 376/364; 403/277; 403/284
[58] Field of Search ...................... 376/178, 362, 364; 403/277, 280, 281, 284

[56] References Cited

U.S. PATENT DOCUMENTS 4,820,479  4/1989  Hornak et al. ........................ 376/364

Primary Examiner—Stephen C. Bentley
Attorney, Agent, or Firm—Herbert L. Lerner; Laurence A. Greenberg

[57] ABSTRACT

Upper and lower core structures of core internals carry a plurality of centering pins which have free ends protruding into recesses in a fuel assembly endpiece. In the case of the upper core structure in particular, the nuts for fixing the centering pins are difficult to access in the event of a subsequent exchange of pins. Therefore, core internals which do not require a nut for securing on the centering pins are preferred. For this purpose, a centering pin is provided with a center bore passing through it. The ends of the center bores facing away from the fuel assemblies are in the form of conically tapering stepped bores. Each stepped bore has a plug which is displaceable in axial direction relative to the centering pin. The peripheral surface of the plug is conically formed in the same direction and with the same pitch as the stepped bore. The centering pin enters into a play-free fitting connection with a bore in a grid plate. The peripheral surface of the centering pin is provided with a grooving at the level of the stepped bore, which enters into a form-locking connection with the wall of the bore in the grip plate, after relative movement of the plug and the centering pin has taken place.

7 Claims, 4 Drawing Sheets

CORE INTERNALS OF A WATER-COOLED NUCLEAR REACTOR

The invention relates to core internals or installed components of a water-cooled nuclear reactor, the upper and lower core structure of which carry a plurality of centering pins, which protrude with their free ends into recesses in a fuel assembly endpiece.

Such core internals are known from the Thiemig pocket book "Druckwasserreaktoren für Kernkraftwerke" (Pressurized Water Reactors for Nuclear Power Stations), 1974 edition, pages 88 to 92. The ends of the centering pins referred to in that publication which pass through the grid plate usually have a threaded stem which allows bracing of the centering pin with a nut. In order to secure the fastening, a weld is made both between the nut and the grid plate of a core structure and between the nut and the threaded stem.

In the case of the upper core structure in particular, many of the securing nuts are not accessible in the event of a subsequent exchange of a damaged centering pin, since they are covered by other components of the core internals.

It is accordingly an object of the invention to provide core internals of a water-cooled nuclear reactor, which overcome the hereinafore-mentioned disadvantages of the heretofore-known devices of this general type and which function without securing nuts for fixing the centering pins.

With the foregoing and other objects in view there are provided, in accordance with the invention, core internals of a water-cooled nuclear reactor, comprising a lower core structure, a grating in the vicinity of the lower core structure, an upper core structure, a grid plate in the vicinity of the upper core structure, fuel assemblies having respective endpieces with recesses formed therein in the vicinity of the grating and the grid plate, at least one of the grating and the grid plate having bores formed therein defining bore walls, and a plurality of centering pins having free ends protruding into the recesses in the endpieces, each of the centering pins having a peripheral surface and having a center bore formed therein with an end facing away from one of the endpieces in the form of a conically tapering stepped bore, the stepped bore being disposed at a given height along the centering pin and the stepped bore defining a conical peripheral surface facing in a given direction with a given pitch, a plug being axially displaceable in the stepped bore relative to the centering pin, the plug having a conical peripheral surface facing in the given direction with the given pitch providing a self-locking conical connection, each of the centering pins being disposed in one of the bores with a fitting connection having as little play as possible, the peripheral surface of each of the centering pins having a grooving formed thereon at the given height being locked or form-lockingly connected to one of the bore walls after relative movement of the plug and the centering pin.

The fitting connection which has as little play as possible backs up or reinforces the form-locking connection in the vicinity of the grooving. As soon as the form-locking connection is established, the virtually play-free fitting connection prevents any transverse movement of the centering pin, so that undesired stresses are kept away from the form-locking connection.

In accordance with another feature of the invention, there is provided a tappet extending through the center bore into a blind bore formed in the plug for axial displacement of the plug, the tappet forming the fitting connection with an impact force chosen in dependence on differences in hardness between the grooving and the bore wall.

In accordance with a further feature of the invention, the plug has at least one peripheral groove formed therein receiving a bead of material of the centering pin after a relative movement of the plug and the centering pin which causes the pressing-in of the grooving, so as to form the conical connection between plug and centering pin at the stepped bore.

As a result, a safeguard against any loosening of the fastening of the centering pin is produced, in addition to the self-locking action of the conical connection.

In accordance with an added feature of the invention, the peripheral surface of the centering pin has a recesses formed therein above and below the grooving, facilitating the penetration of the grooves into the bore wall.

In accordance with an additional feature of the invention, the centering pin has a shoulder with a groove formed therein facing the grid plate and the centering pin has an annular groove formed therein at a distance from the groove.

This is done in order to minimize the stress concentration in the region of the centering pin which is at risk of rupture.

In accordance with a concomitant feature of the invention, the centering pin has an offset formed therein, and there is provided an intermediate piece being disposed in the offset and having the grooving formed thereon for providing the form-locking connection.

Other features which are considered as characteristic for the invention are set forth in the appended claims.

Although the invention is illustrated and described herein as embodied in core internals of a water-cooled nuclear reactor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
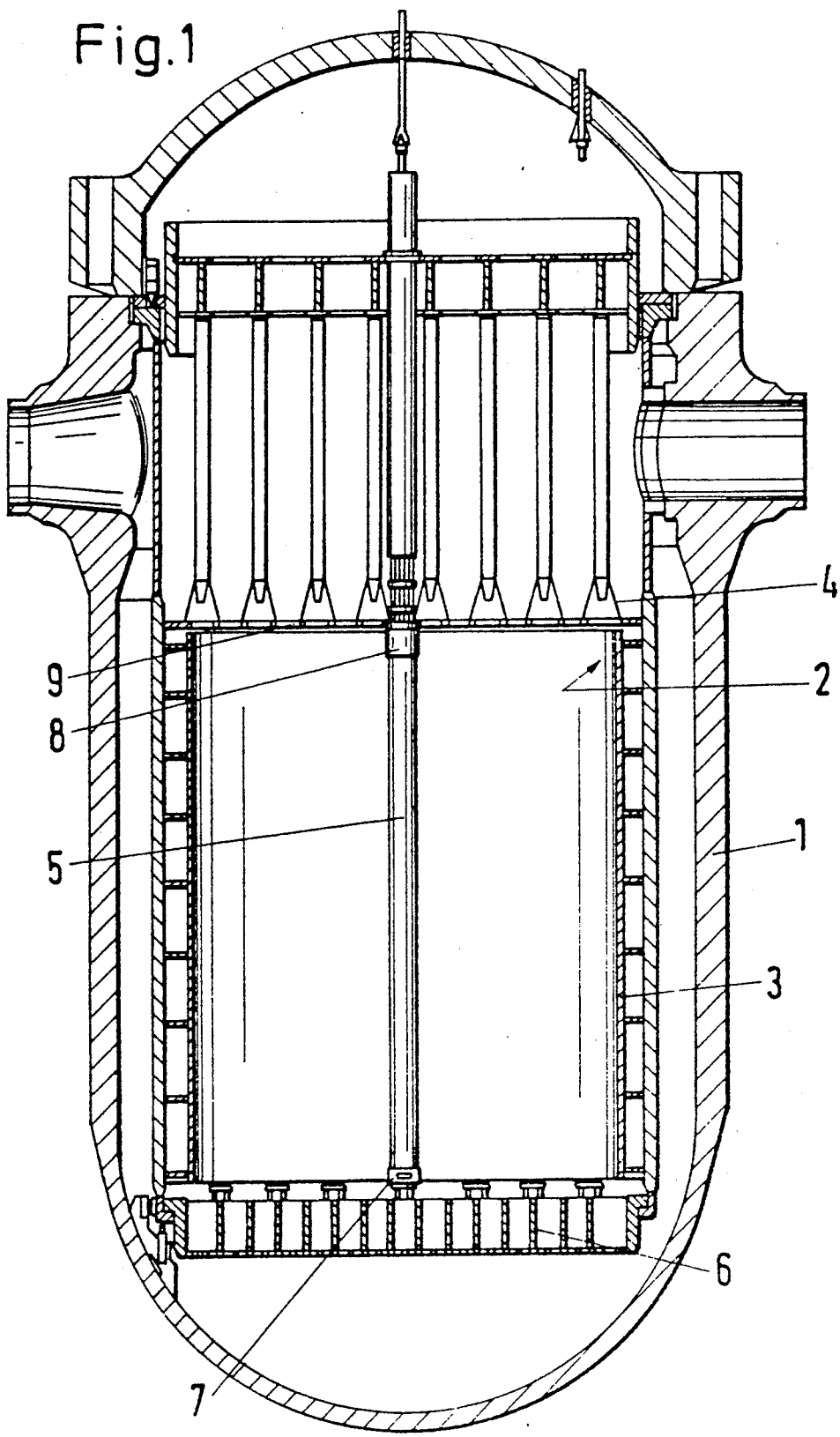
FIG. 1 is a diagrammatic, longitudinal-sectional view of a reactor pressure vessel with core internals disposed therein.
Figure 3:
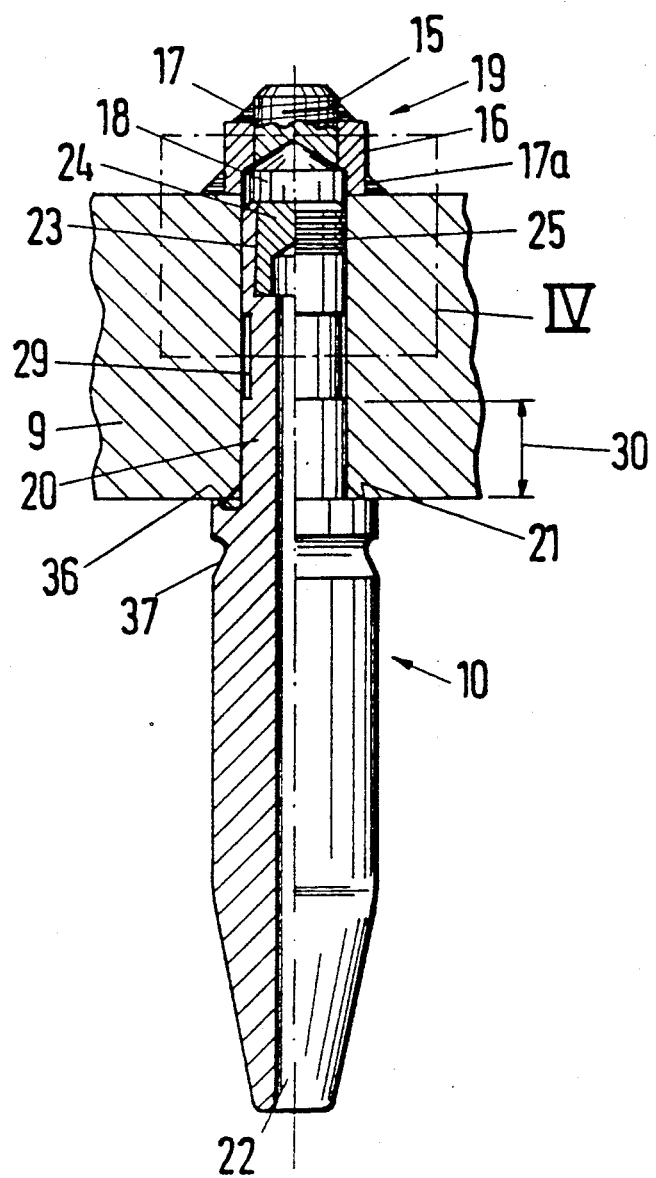
FIG. 3 is an enlarged, fragmentary, longitudinal-sectional view of a grid plate of the upper core structure with a centering pin fastened therein.

Referring now to the figures of the drawing in detail and first, particularly, to FIG. 1 thereof, there is seen a longitudinal section of a reactor pressure vessel 1 of a water-cooled nuclear reactor plant. Core internals 2 include a lower core structure 3 and an upper core structure 4 and form a supporting structure for the reactor core. Only one of a plurality of fuel assemblies 5 forming the reactor core is shown. The fuel assemblies are placed on a grating 6, in such a way that non-illustrated centering pins, which are fastened to the grating, protrude into bores in an endpiece 7, for example the bottom endpiece, of the fuel assembly. A fuel assembly endpiece 8, for example the top endpiece, has non-illustrated hold-down springs, which support the fuel assembly with respect to a grid plate 9 of the upper core structure. A plurality of centering pins 10, which are shown in FIG. 3, extend in the direction of the fuel assemblies and are fastened in the grid plate 9. As a rule, each fuel assembly is assigned two centering pins, which protrude into recesses in the fuel assembly endpiece 8 for fine centering of the fuel assembly.

Figure 2:
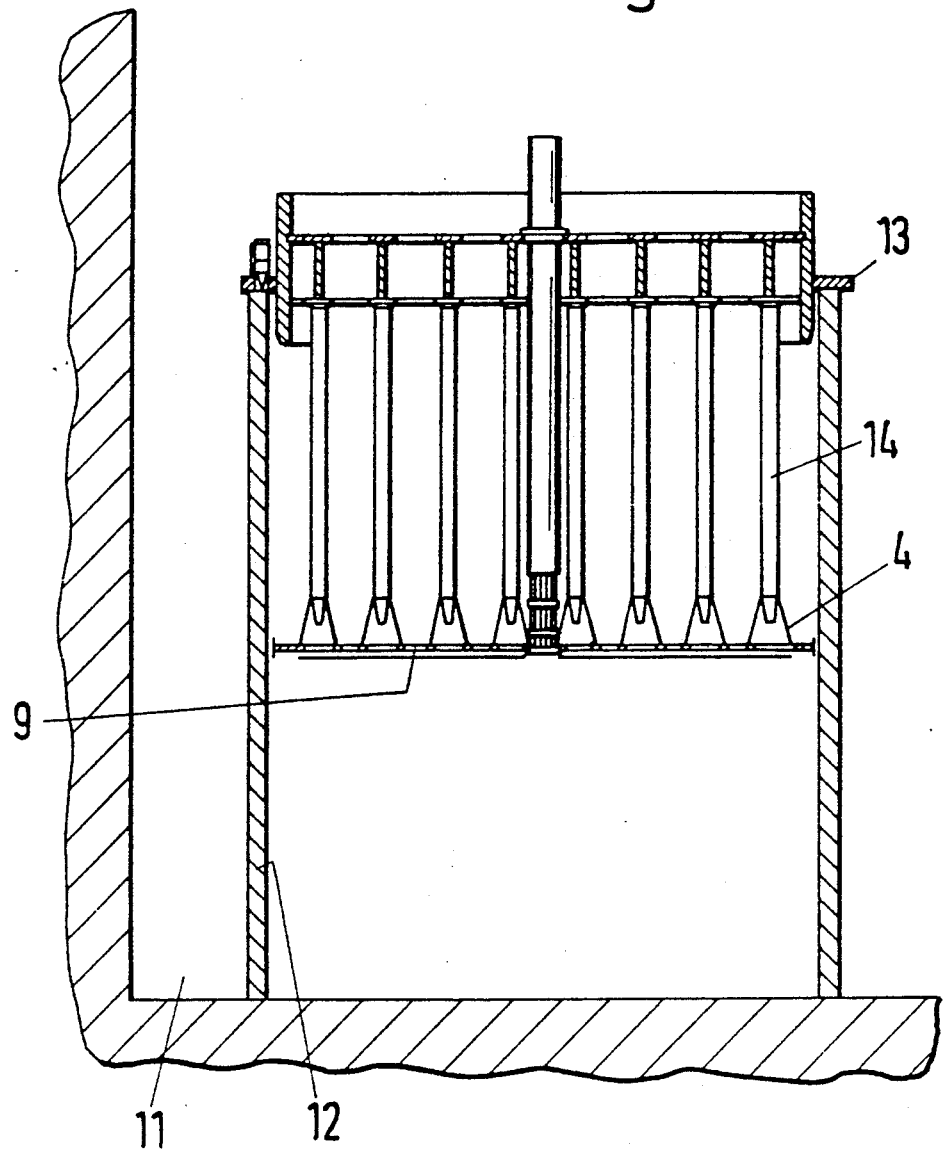
FIG. 2 is a fragmentary, longitudinal-sectional view of a fuel element storage pool with an upper core structure placed therein.

In FIG. 2, the upper core structure 4 is placed on a rack 12 located in a fuel storage pool 11 of a nuclear reactor plant. The upper core structure 4 is essentially formed of a supporting plate 13 which is supported on the rack, and supports 14 which surround control assembly guide inserts or thimbles and support the grid plate 9. A non-illustrated manipulator which carries viewing equipment, may be disposed underneath the rack 12.

If a broken-off centering pin is discovered during inspection, a fragment of the centering pin which is still fastened in the grid plate 9 is removed with the aid of working tools and handling equipment and is replaced by a new centering pin. A non-illustrated manipulator likewise serves as a carrier for the working tools and handling equipment.

FIG. 3 shows an enlarged portion of a grid plate 9 with a centering pin 10 inserted therein. A conventional centering pin had previously been inserted in the grid plate 9, had broken off and had to be removed. A piece of a threaded stem 15 of the conventional pin which is braced with respect to the grid plate 9 by a nut 16, can still be seen. In order to secure the conventional centering pin against loosening, it was provided with a weld 17, 17a around it, both between the nut 16 and the grid plate 9 as well as between the nut and the threaded stem 15. The fragment of the broken-off centering pin remaining in the grid plate is drilled out from the lower surface of the grid plate with the aid of the previously-mentioned manipulator, in such a way that a cylindrical bore 18 is produced which extends into the nut 16 only so far as to ensure that the welds 17, 17a are not damaged and a cap 19 formed of the nut 16 and the remainder of the threaded stem 15 remains. In the event of a possible rupture of the newly-inserted centering pin, the cap 19 reliably prevents fragments from travelling into the primary coolant circuit of the nuclear reactor plant from the upper surface of the grid plate 9.

Figure 4:
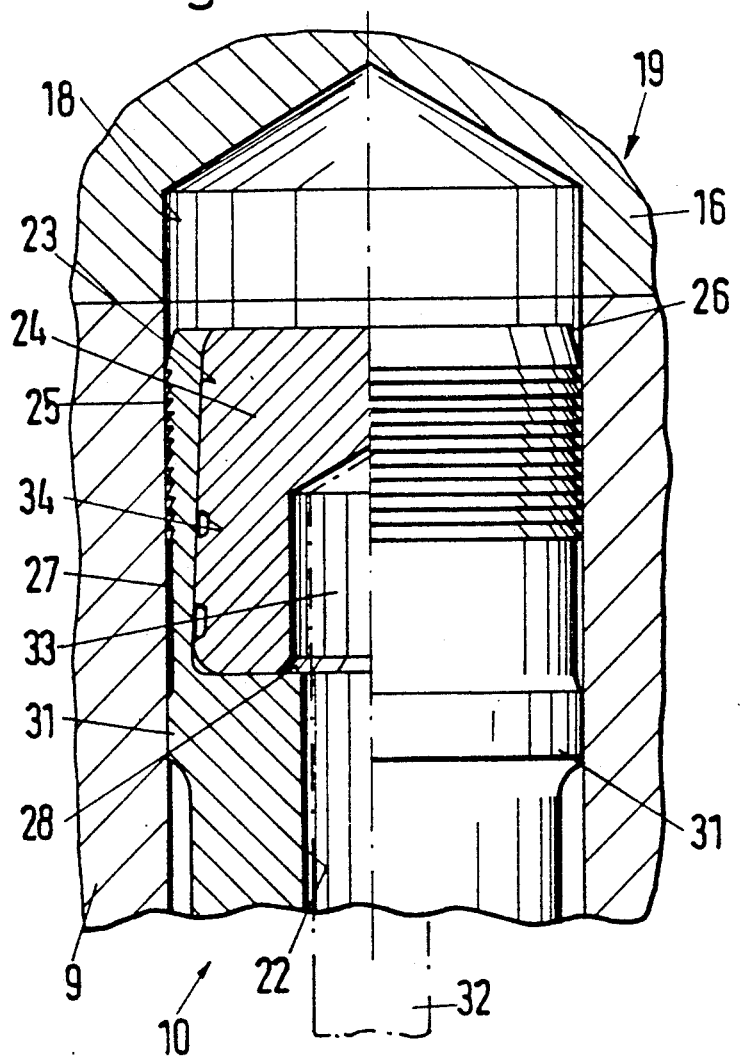
FIG. 4 is an enlarged view of the portion IV of FIG. 3 showing the centering pin before fixing thereof.
Figure 5:
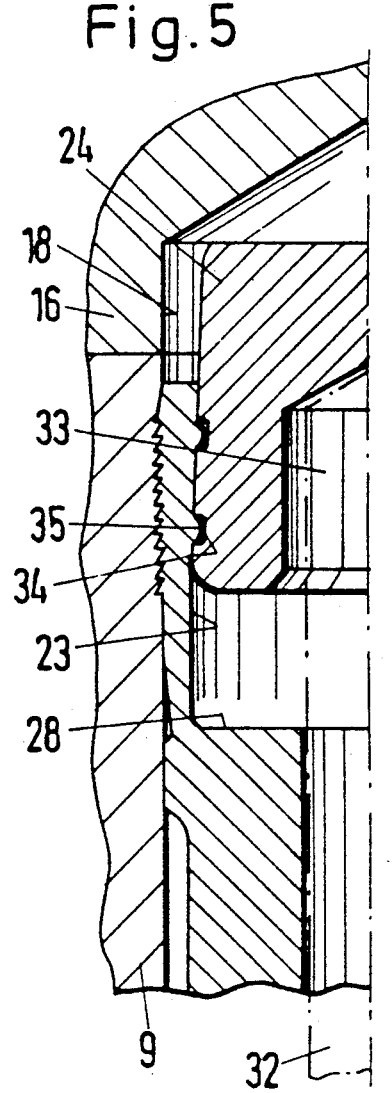
FIG. 5 is a view of a portion of the centering pin according to FIG. 4 after fastening thereof.

The bore 18 in the grid plate 9 and a shank 20 of the centering pin 10 are brought to a fitting dimension which provides a play-free fitting connection or tight fit, after pushing-in the centering pin 10 until a shoulder 21 of the centering pin contacts the lower surface of the grid plate 9. The centering pin 10 is provided with a center bore 22, which passes through it and is widened into a stepped bore 23 at the end of the centering pin protruding into the grid plate 9. The peripheral surface of the stepped bore is constructed as a cone, which tapers towards the cap 19. A plug 24, which has a peripheral surface that is conically constructed in the same manner as the stepped bore, is inserted into the space defined by the stepped bore. The shank 20 is then given its above-mentioned fitting dimension as well as a surface structure which can be seen in particular from FIG. 4. In fact, a grooving or scoring 25 is formed in a partial region of the peripheral surface. The shank 20 is provided with a chamber 26 above the grooving or scoring and a recess 27 below the grooving or scoring, which extends to a location below the shoulder 28 of the stepped bore 23. According to FIG. 3, a further recess 29 is provided at the middle region of the shank 20. The shank 20 thus has a collar 31 shown in FIG. 4 with a fitting dimension necessary to achieve a play-free tight fit with the cylindrical bore in a region 30 seen in FIG. 3. The outside diameter of the grooving or scoring 25 may likewise have the fitting dimension. However, as a rule it is slightly set back by about 0.03 to 0.10 millimeter in order to facilitate pushing the centering pin into the bore 18. In any case, the tight fit region is dimensioned large enough to ensure that the centering pin remains in its position of its own accord after pushing into the bore 18. The centering pin 10 is pushed into the bore 18 by means of a non-illustrated setting tool, until the shoulder 21 makes contact. In that position, as indicated in FIGS. 4 and 5, a tappet 32 of the setting tool which is carried by the non-illustrated manipulator, is engaged in a blind bore 33 in the plug 24 and moves the plug 24 into the position shown in FIG. 5, by acting on it hydraulically.

Due to the conical construction of the centering pin in the vicinity of the stepped bore 23 and of the plug 24, the grooving or scoring 25 is pressed into the wall of the bore 18, so that a form-locking connection is produced. A formlocking connection is one which connects two elements together due to the shape of the elements themselves, as opposed to a force-locking connection, which locks the elements together by force external to the elements. The force exerted on the plug 24 through the tappet 32 is chosen in dependence on the difference in hardness between the materials of the grid plate 9 and the grooving or scoring 25. Due to the self-locking action of the conical connection between the plug and the stepped bore, any loosening of the form-locking connection is ruled out. In addition, peripheral grooves 34 form a safeguard against loosening of the connection since they receive a slight bead formation 35 of the material of the centering pin (10) at the stepped bore 23, after a relative movement of the plug and the centering pin has taken place.

The shoulder 21 of the centering pin 10 has a groove 36 formed therein which acts in conjunction with an annular groove 37 formed below the shoulder, to minimize the stress concentration in the region which is at risk of rupture.

The exemplary embodiment is intended for the replacement of a broken pin. However, the centering pin according to the invention can be inserted in the same way when initially equipping a grid plate. In such a case, the cap 19 which is shown for the repair described above is not formed of the remains of a nut 16 and a threaded stem 15, but instead can be fitted on the grid plate as an integral component, if protection is required.

Figure 6:
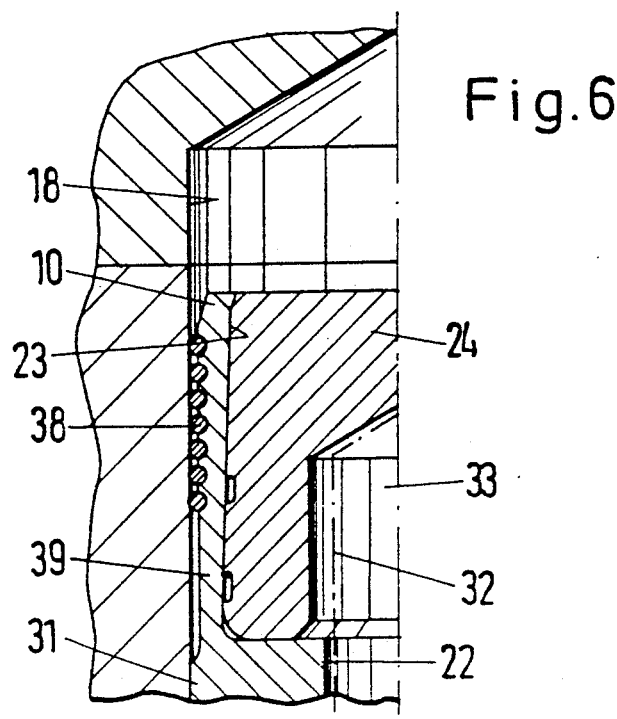
FIG. 6 is a view similar to FIG. 5 of another construction of the grooving or scoring according to FIG. 4.

Alternatively, according to FIG. 6, instead of the grooving or scoring 25, the shank 20 may be equipped with a offset 39, which receives an intermediate piece 38 that has a surface which provides the form-locking connection. The intermediate piece may, for example, be a closely wound spring wire of corresponding hardness, which then forms the grooving or scoring itself.

The foregoing is a description corresponding in substance to German Application P 38 39 838.9-33, dated Nov. 25, 1988, the International priority of which is being claimed for the instant application, and which is hereby made part of this application. Any material discrepancies between the foregoing specification and the aforementioned corresponding German application are to be resolved in favor of the latter.

We claim:

1. Core internals of a water-cooled nuclear reactor, comprising a lower core structure, a grating in the vicinity of said lower core structure, an upper core structure, a grid plate in the vicinity of said upper core structure, fuel assemblies having respective endpieces with recesses formed therein in the vicinity of said grating and said grid plate, at least one of said grating and said grid plate having bores formed therein defining bore walls, and a plurality of centering pins having free ends protruding into said recesses in said endpieces, each of said centering pins having a peripheral surface and having a center bore formed therein with an end facing away from one of said endpieces in the form of a conically tapering stepped bore, said stepped bore being disposed at a given height along said centering pin and said stepped bore defining a conical peripheral surface facing in a given direction with a given pitch, a plug being axially displaceable in said stepped bore relative to said centering pin, said plug having a conical peripheral surface facing in said given direction with said given pitch, each of said centering pins being disposed in one of said bores with a fitting connection having as little play as possible, said peripheral surface of each of said centering pins having a grooving formed thereon at said given height being locked to one of said bore walls after relative movement of said plug and said centering pin.

2. Core internals according to claim 1, including a tappet extending through said center bore into a blind bore formed in said plug, said tappet forming said fitting connection with an impact force chosen in dependence on differences in hardness between said grooving and said bore wall.

3. Core internals according to claim 1, wherein said plug has at least one peripheral groove formed therein receiving a bead of material of said centering pin after a relative movement of said plug and said centering pin.

4. Core internals according to claim 1, wherein said peripheral surface of said centering pin has a recesses formed therein above and below s id grooving.

5. Core internals according to claim 1, wherein said centering pin has a shoulder with a groove formed therein facing said grid plate and said centering pin has an annular groove formed therein at a distance from said groove.

6. Core internals according to claim 1, wherein said centering pin has an offset formed therein, and including an intermediate piece being disposed in said offset and having said grooving formed thereon.

7. Core internals of a water-cooled nuclear reactor, comprising a lower core structure, a grating in the vicinity of said lower core structure, an upper core structure, a grid plate in the vicinity of said upper core structure, fuel assemblies having respective endpieces with recesses formed therein in the vicinity of said grating and said grid plate, at least one of said grating and said grid plate having bores formed therein defining bore walls, and a plurality of centering pins being disposed in said bores and having free ends protruding into said recesses in said endpieces, each of said centering pins having a peripheral surface and having a center bore formed therein with an end facing away from one of said endpieces in the form of a stepped bore disposed at a given height along said centering pin, a plug being axially displaceable in said stepped bore relative to said centering pin, said plug having a size and orientation substantially matching said stepped bore, said peripheral surface of each of said centering pins having a grooving formed thereon at said given height being locked to one of said bore walls after relative movement of said plug and said centering pin.

* * * * *